United States Patent [19]

Johnson, Jr.

[11] Patent Number: 5,557,786
[45] Date of Patent: Sep. 17, 1996

[54] THREADED, HEIGHT-BALANCED BINARY TREE DATA STRUCTURE

[75] Inventor: Harold E. Johnson, Jr., Newtown, Pa.

[73] Assignee: Advanced Computer Applications, Inc., Newtown, Pa.

[21] Appl. No.: 185,436

[22] Filed: Jan. 24, 1994

[51] Int. Cl.$^6$ .................................................... G06F 7/00
[52] U.S. Cl. .................. 395/600; 364/251.6; 364/282.1; 364/DIG. 1
[58] Field of Search .................................. 395/600, 700; 364/251.6, 282.1

[56] References Cited

U.S. PATENT DOCUMENTS

| T916,004 | 11/1973 | Conner, II . | |
|---|---|---|---|
| 4,486,830 | 12/1984 | Taylor, Jr. et al. | 364/146 |
| 4,606,002 | 8/1986 | Waisman et al. | 364/200 |
| 5,263,160 | 11/1993 | Porter, Jr. et al. | 395/600 |

OTHER PUBLICATIONS

"Fundamentals of Data Structures in Pascal", Horowitz et al., Computer Science Press, 1990, pp. 572–591.
Brinck, Keith. *The Computer Journal*, "The Expected Performance of Traversal Algorithms in Binary Trees." vol. 28, No. 4, 1985, pp. 426–432.
Day, A. Colin. *The Computer Journal*, "Algorithms Supplement, Algorithm 91." vol. 19, No. 4, pp. 360–361.
Brinck, K. and N. Y. Foo. *The Computer Journal*, "Analysis of Algorithms on Threaded Trees." vol. 24, No. 2, 1981. pp. 148–155.
Zheng, Si–Qing. *Proc. of the First Great Lakes Computer Science Conference*, "A Simple and Powerful Representation of Binary Search Trees." 1990.
Knuth, Donald E. *The Art of Computer Programming*, 2nd ed., vol. 1, (Addison–Wesley: Reading, MA), 1973, pp. 314–328.
Knuth, Donald E. *The Art of Computer Programming*, 2nd ed., vol. 3, (Addison–Wesley: Reading, MA), 1973, pp. 423–479.
Iyengar, S. Sitharama and Hsi Chang. *Software—Practice and Experience*, "Efficient Algorithms to Create and Maintain Balanced and Threaded Binary Search Trees." vol. 15(10), (John Wiley & Sons, Ltd.: Oct. 1985), pp. 925–941.
Janicki, Ryszard and Waldemar W. Koczkodaj (eds.). *ICCI '89, Computing and Information*, vol. II, "Threaded Binary Search Trees Without Tags" by Ying Cheng. (Canadian Scholars' Press Inc.: Princeton), 1989, pp. 82–86.
Janicki, R. and W. W. Koczkodaj (eds.). *Computing and Information.* "Optimal Algorithms for Perfectly Balancing Trees," by Si–Qing Zheng and Enamul Haq. (Elsevier Science Publishers B.V.: North–Holland), 1989, pp. 125–129.
Akl, Selim et al. (eds.) *ICCI '90, Advances in Computing and Information.* "Ordered Labeling of Trees with Applications" by Ying Cheng and Si–Qing Zheng. (Canadian Scholars' Press Inc.: Toronto), 1990, pp. 19–20.
Haq, Enamul and Si–Qing Zheng. *Phoenix Conference on Computers and Communications, 1989 Conference Proceedings*, "Parallel Algorithms For Balancing Threaded Binary Search Trees." Mar. 22–24, 1989, pp. 286–290.
Currie, Douglas H., Jr. *Fourth Dimensions*, vol. II, No. 4, "Balanced Tree Deletion in FASL." pp. 96–108.

*Primary Examiner*—Kevin A. Kriess
*Assistant Examiner*—Dennis M. Butler
*Attorney, Agent, or Firm*—Dann, Dorfman, Herrell and Skillman, P.C.

[57] ABSTRACT

A hierarchical data structure is provided in the form of a tree for storing key-indexed entries. Each entry of the tree includes a balance bias indicator and pointer fields for maintaining (i) link pointers to successive entries in the hierarchy or (ii) thread pointers to preceding entries in the hierarchy. Entries are added to the tree, or removed from the tree, while the tree is maintained in a height-balanced condition. During insertion of a new entry, the tree is traversed along a search path to determine an insertion point for the entry and to determine a potential rebalancing point in the tree. The potential rebalancing point in the tree is identified on the basis of the balance bias indicators of the entries in the search path. The tree is rebalanced, if necessary, about the potential rebalancing point determined during the insertion traversal.

15 Claims, 5 Drawing Sheets

FIG. 5D (i) LINK(CURR,-1)THREAD (ii) LINK (CURR,-1) NOT THREAD

FIG. 8B (i) LINK (NEXT(CURR),1) THREAD

FIG. 9A (ii) LINK NEXT(CURR),1) LINK

FIG. 9B

THREADED, HEIGHT-BALANCED BINARY TREE DATA STRUCTURE

FIELD OF THE INVENTION

The present invention relates to the construction and maintenance of a hierarchically-arranged data structure. More specifically, the invention relates to a binary tree data structure that is linked, threaded, and height-balanced.

BACKGROUND OF THE INVENTION

Hierarchical databases, such as binary search trees, are commonly used to provide storage and access to data records that are identifiable by a unique key, such as a string or numeric value. Each record of a binary search tree is associated with up to two other records, called child records, by a pair of pointers designated left and right link pointers. Assignment of a new record as a left or right child of an existing record depends upon the relationship of the key of the new record to the name of the parent record according to a predetermined ordering relation. As records are randomly added to a binary search tree, certain branches or search paths within the tree may become longer than other paths within the tree. Tree-balancing methods are known by which search paths within a binary tree may be made approximately equal in length thereby maintaining a shorter average length of time required to randomly access information stored in a binary tree than in an unbalanced tree or other data structures such as a linked list.

While binary trees may be periodically balanced to provide a low random access delay, another type of tree, a threaded binary tree, allows efficient sequential access to tree-structured data. Each entry in a threaded tree maintains a pointer to a previous entry, such as a parent entry, or to its child entries if any. Such pointers to previous entries are called threads. Sequential access to records within a threaded tree utilizes thread pointers as well as link pointers in order to locate successive entries during sequential traversal of a tree. It would be desirable in the operation of computing systems where the use of both random access and sequential access to tree-structured data is anticipated, to provide a single binary tree structure capable of providing the advantages of balanced binary trees with respect to random access and the advantages of threaded binary trees with respect to sequential access. It would further be desirable to provide methods for inserting and deleting entries within threaded binary trees while maintaining a balanced condition.

SUMMARY OF THE INVENTION

A binary tree data structure is provided wherein each entry of the tree includes a key field for identifying each entry, a data pointer field for pointing to data associated with the key, a left pointing field for pointing to an entry along a leftward branch of the tree, a right pointing field for pointing to an entry along a rightward branch of the tree, bits within the left and right pointing fields for indicating a type of pointing, and a balance field for indicating a balance condition, or bias, between the left and right branches subsequent to each entry. Entries within such trees may be related according to the contents of their respective left and right pointing fields by two types of pointing such as by link pointing for allowing efficient random access to the entries of such trees or by thread pointing for allowing efficient sequential access to the entries of such trees.

Such a binary tree data structure is further maintained in a balanced condition with respect to the lengths of rightward and leftward branches of the tree. Such a tree may be accessed in order to retrieve information, to store information, to insert new information, or to delete entries in the tree structure while maintaining said balanced, linked, and threaded conditions of such a tree. Combined insertion/rebalance and deletion/rebalance methods are able to operate faster and with less computational overhead than separate and distinct insertion, deletion and rebalancing methods. During insertion or deletion, the balance bias conditions of tree entries along path to the insertion/deletion location are recorded in order to identify potential rebalancing points. Traversal from one entry of a tree to another is accomplished by successive comparisons of values within the key fields of the entries and selection of pointer fields for obtaining successive entries depending upon both the desired order of the traversal and the results of the key value comparisons. Numeric key comparisons may be carried out more rapidly than alphanumeric key comparisons. For manipulation of trees using alphanumeric keys, a path buffer is used to store a map of the path followed during insertion or deletion of an entry in order to reduce the number of key comparisons required during rebalancing.

A threaded height-balanced tree is further provided with a header for maintaining information relating to the tree such as data fields for indicating the number of entries in the tree, the height of the tree, pointers relating to the path buffer, a pointer to the root entry of the tree, and a lock indicator for allowing exclusive access to the tree.

BRIEF DESCRIPTION OF THE DRAWINGS

The foregoing summary, as well as the following detailed description of a preferred embodiment of the present invention, will be better understood when read in conjunction with the appended drawings, in which.

DETAILED DESCRIPTION

Figure 1:
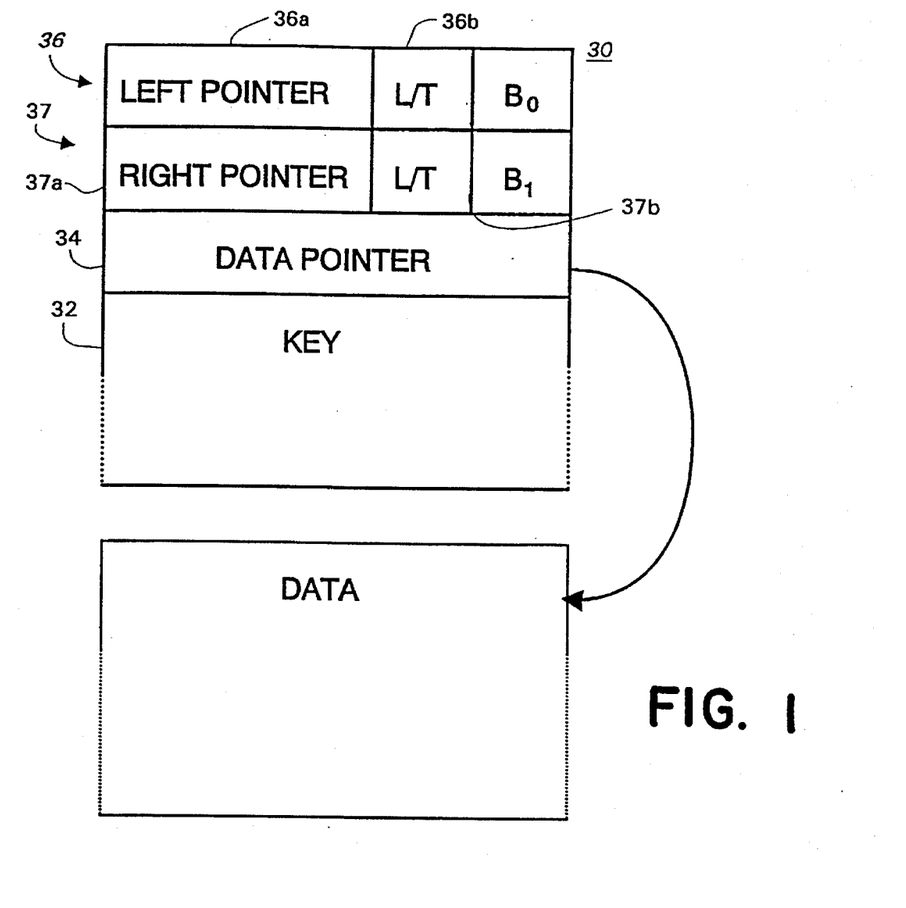
FIG. 1 is a memory map of an entry of a binary tree.

An entry 30 of a binary search tree is shown in FIG. 1. The entry 30 includes a key field 32, a data pointer field 34, a left pointer field 36, a right pointer field 37, and a balance condition field 38.

The key field 32 contains an identifier of the entry 30 that is unique to the entry 30 within a tree. The key field may contain either a numeric or alphanumeric keys of arbitrary length. Keys are compared and sorted by routines that perform binary sorts according to an ordinal relation between the keys being compared. Alphanumeric keys are sorted according to a numeric code, such as ASCII, which provides numeric values representative of alphanumeric keys. The data pointer field 34 of the entry 30 contains a pointer to data located elsewhere in memory that pertains to the key. In alternate embodiments of trees that are used to arrange relatively short data fields associated with corresponding keys, the data itself may be included in the entry 30 rather than being indicated by a data pointer field.

The left and right pointer fields 36 and 37 are pointers to the memory locations of other entries in the tree. The bits 36b and 37b within the respective left and right pointer fields are used to indicate a type of pointing depending upon the nature of the association between the entry 30 and the entry indicated by the respective left and right pointers. In a preferred embodiment, the type of pointer contained within a left or right pointer field may be a link pointer for indicating a link to another entry or a thread pointer for indicating a thread to another entry. A link pointer connects a given entry to a neighboring entry that falls below the given entry in the tree hierarchy. A thread pointer connects a given entry to a neighboring entry that falls above the given entry in the hierarchy. In order to use the same two fields for both types of pointing, the link/thread bits 36b and 37b may be set to indicate either type of pointing.

The balance bits, $B_0$ and $B_1$, within the respective left and right pointer fields jointly indicate the balance condition, or bias, of the collection of subordinate entries, if any, forming a subtree headed by the entry 30. A subtree associated with a given entry is that collection of other entries that are subordinate to, or beneath, the given entry within the hierarchy of the tree. One of three possible balance conditions may be indicated by the balance bits as (i) $B_0B_1=00$ indicating neutral bias, or equal height of the left and right subtrees, (ii) $B_0B_1=01$ indicating rightward bias, or greater height of the right subtree, and (iii) $B_0B_1=11$ indicating leftward bias, or greater height of the left subtree. The balance bits are set to $B_0B_1=00$ within entries that have no links to child entries. In alternative embodiments, the balance bits may be assigned to a separate balance field within an entry. However in systems employing a relatively large word size, such as 32 bits, the use of a separate balance field to indicate one of only 3 possible conditions would be wasteful. Hence the balance bits and the link/thread bits may be incorporated into the left and right pointer fields while still providing 30 bits for uniquely identifying each entry.

Figure 2A:
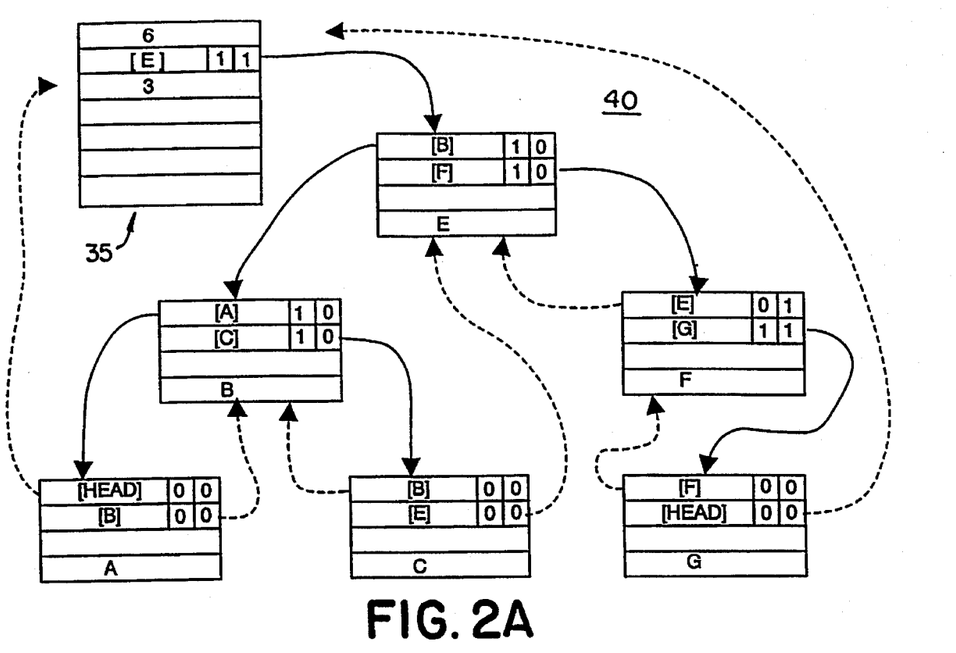
FIGS. 2A–2C are diagrams of a binary tree requiring a single rotation of a subtree upon insertion of an entry.

A binary tree 40 is shown in FIG. 2A wherein link pointers are indicated by solid arrowed lines and thread pointers are represented by broken arrowed lines. The tree 40 is a hierarchically-arranged data structure constructed of six entries similar to entry 30 described in connection with FIG. 1. The entries are uniquely identified by the contents of their key fields as Entry A, Entry B, Entry C, Entry E, Entry F, and Entry G. The tree 40 is arranged such that entries are linked by right link pointers in the rightward direction to alphabetical successors and entries are linked by left link pointers in the leftward direction to alphabetical predecessors. The tree 40 further includes a tree header, such as tree header 35, having a right link to the root entry of the tree, Entry E. The particular structure and contents of the tree header 35 are discussed more fully hereinafter.

Entry E is the root entry of the tree 40. The right pointer field of Entry E is set to indicate a rightward link pointing to the key field of Entry F. The right pointer field of Entry F is set to indicate a rightward link pointing to the key field of Entry G. The left pointer field of Entry E is set to indicate a leftward link to the key field of Entry B. The left and right pointer fields of Entry B are both set to indicate links. Entry B includes a left link to Entry A and a right link to Entry C. It should be apparent that the base address of an entry indicated by the left or right pointer fields is not of particular importance as long as pointers to identically-structured entries are consistently assigned so that any of the entry fields may be obtained by appropriate indexing from the base address.

The link associations among the entries of the tree 40 allow random key-indexed access to the data indicated by the data pointer fields of the tree entries. For example, data associated with a particular entry may be retrieved using the search procedure 50 shown in FIG. 3. The search procedure 50 is invoked with the address of a tree header and an input value or string corresponding to the key of the desired data. In step 52, the tree header is accessed and the right pointer filed of the tree header is obtained. Then in step 53, the link/thread bit is tested to determine whether the right pointer is a link or a thread. If in step 53, the pointer is a thread, control passes to step 55 wherein a failure indication, such as an error flag, is returned and then the search procedure 50 exits. If in step 53, the pointer is a link, then control passes to step 54.

Figure 3:
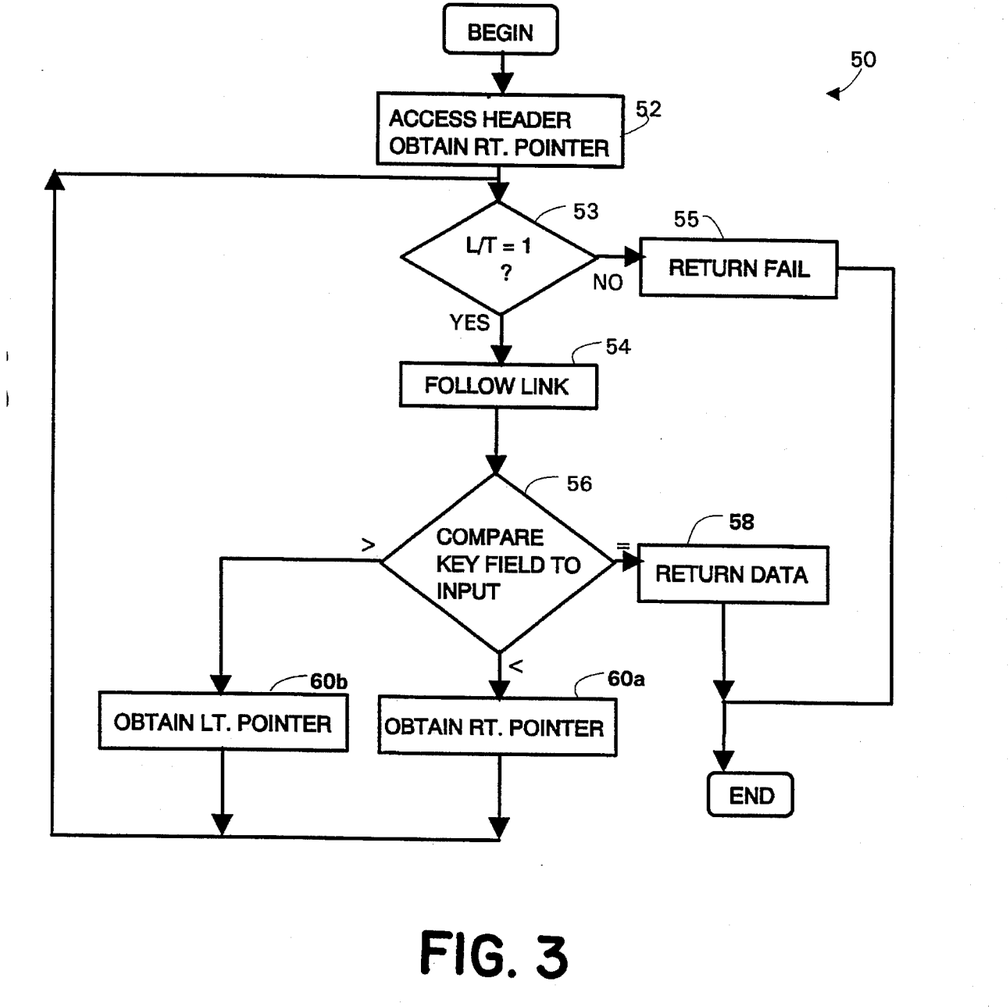
FIG. 3 is a logical flowchart of a routine for finding entries of a tree.

In step 54, the current entry is set to the entry indicated by the current link pointer. Then in step 56, the key field of the current entry is compared to the input value. If the current key is equal to the input key, control passes to step 58 wherein the data pointer is returned along with an indication of a successful search. Then, the search procedure 50 exits. If the comparison in step 56 results in an inequality, the search procedure 50 determines which branch of the tree to follow depending upon the sign of the inequality. For example, if the current key value is less than the input value, control passes to step 60a wherein the right pointer of the current entry is obtained. If the current key value is greater than the input value, control passes to step 60b wherein the left pointer of the current entry is obtained. In alternative embodiments, steps 60a and 60b may be implemented as a single function by using the algebraic sign of the difference between the current key and the input key to calculate an index value for use as an offset from the base address of the current entry in order to obtain the appropriate pointer field.

Proceeding from step 60a or 60b, the search procedure 50 returns to step 53 in order to repeat the process of testing the link bit of the current pointer and then following the appropriate links until the desired key is found or a thread is reached.

The number of key comparisons executed during the course of a particular tree search, such as are performed in step 53 of the search procedure 50, depends upon the size of the tree and the relative value of the input key. In searches of the tree 40 of FIG. 2A, the required number of comparisons would be 1 to find Entry E, 2 to find Entries B and F, and 3 to find Entries A, C or G. Hence, the average number of comparisons required to find an entry of the tree 40 is 2.33. Were the entries of tree 40 arranged as a sequential list, the average number of comparisons required to find an entry would be 3.5. In general, random access to a sequential list of n entries requires on the order of n/2 comparisons while random access to a binary tree requires on the order of $\log_2(n)$. The sequence of entries encountered during a particular search is hereinafter referred to as the search path.

In addition to having link pointers for providing random access, the tree 40 of FIG. 2A further includes thread pointers which are used to facilitate efficient sequential access. Since, on average, more than half of the entries of a binary tree do not require link pointers to other entries, the unused link pointer fields may be used as thread pointer fields. The type of pointing, either link or thread pointing, is indicated by the assignment of the link/thread bits within each pointer field.

Referring to the tree 40 of FIG. 2A, thread pointers are shown as broken arrowed lines. Rightward pointing threads point to sequential successor entries. Leftward pointing threads point to sequential predecessor entries. There are two special cases of thread pointer assignment: the left thread pointer of the first sequential, or leftmost, entry (Entry A in tree 40 of FIG. 2) and the right thread pointer of the last sequential, or rightmost, entry (Entry G in tree 40 of FIG. 2) are assigned to point to the tree header 35. According to these rules of thread assignment and using alphabetical order, the left link/thread field of Entry A points to the tree header 35, since Entry A is the first entry in alphabetical order of the entries of the tree 40; the right link/thread field of Entry A points to Entry B; the left link/thread field of Entry C points to Entry B; the right link/thread field of Entry C points to Entry E; the left link/thread field of Entry F points to Entry E; the left link/thread field of Entry G points to Entry F; and the right link/thread field of Entry G points to the tree header 35.

Figure 4:
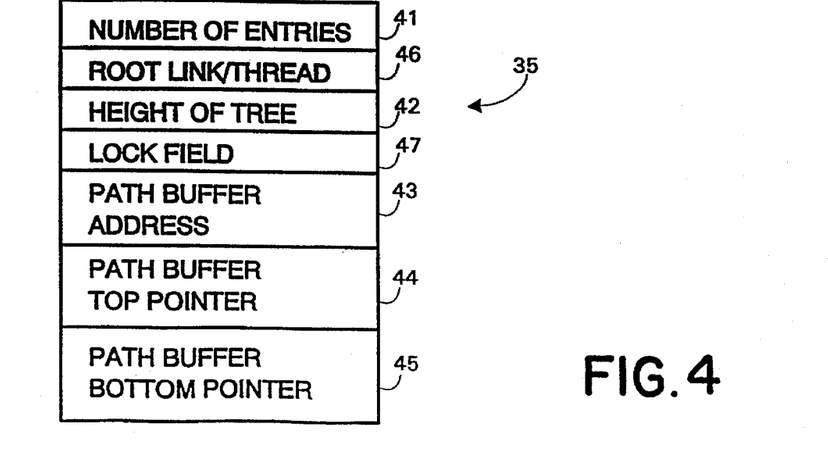
FIG. 4 is a memory map of a binary tree header.

The tree header 35, shown in greater detail in FIG. 4, is a data structure for allowing tasks to access a tree and for providing information about the tree. Tree header 35 includes a field 41 for indicating the number of entries in the tree, a field 42 for indicating the height, or longest search path, of the tree, a path buffer address field 43, a path buffer top pointer field 44, a path buffer bottom pointer field 45, a rightward link pointer 46 to the root entry of the tree, and a lock indicator field 47 for allowing exclusive access to the tree.

The height of a tree is the number of levels of hierarchy among the entries of the tree. The height of a tree may also be defined as the length, in terms of numbers of links plus one from the root entry, of the longest path from the root entry to an entry which has no links, such as Entry C of the tree 40. The height of tree 40 is therefore 3.

The path buffer address 43, path buffer top pointer 44, and path buffer bottom pointer 45 of the tree header 35 are parameters related to a path buffer which is a stack used by tree manipulation procedures to store pointers to accessed entries. Traversal of a tree having numeric keys involves direct greater-than and less-than key comparisons. Traversal of a tree having alphanumeric keys involves comparisons of values representing the alphanumeric keys. In order to traverse an alphanumerically-keyed tree, a greater amount of time is spent performing key comparisons than in traversals of numeric-keyed trees. The path buffer provides a map of the path followed through an alphanumeric-keyed tree during manipulation so that the number of key comparisons may be reduced.

The root pointer 46 of the tree header 35 points to the root entry of the tree as a rightward link from the tree header. A root pointer that is set to indicate a thread designates an empty tree or a tree that has no entries.

The lock field 47 of the tree header 35 provides for exclusive access to a tree by tasks in a multi-tasking environment. In the absence of a locking provision, inconsistencies would result from, for example, two tasks simultaneously attempting to insert or delete entries. Therefore, a task which is accessing entries of a selected tree may set the lock field to a lock value that may be detected by other tasks which may require access to the tree. Upon detection of a lock condition, the other tasks may join a queue of tasks waiting to use the tree.

A tree is considered height-balanced if the height of the left sub-tree and the height of the right sub-tree do not differ by more than one level of hierarchy. For example, the tree 40 of FIG. 2A is a balanced tree since the height of the left sub-tree, headed by Entry B, is two and the height of the right sub-tree, headed by Entry F, is also two. The balance bits of Entry E are set to denote an equally balanced tree. The sub-tree headed by Entry F has a height of one on its right side and a height of zero on the left side. Such a rightward-biased balance condition is designated by the balance bits of Entry F. The addition of a rightward child entry linked to Entry G would cause the sub-tree headed by Entry F to become unbalanced.

Figure 2B:
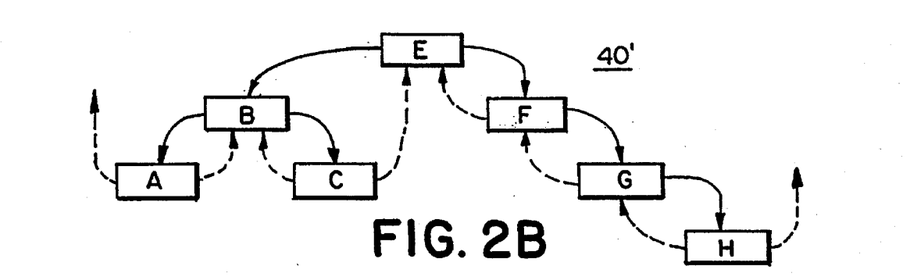
Figure 2C:
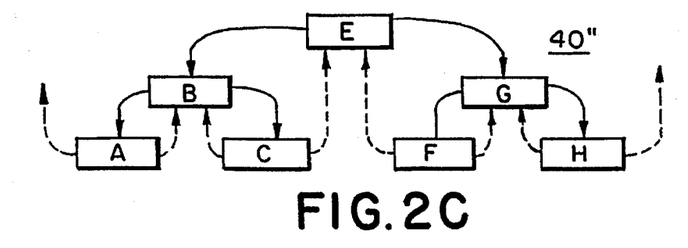

Rebalancing of an unbalanced tree may be accomplished by a single rightward or leftward rotation of entries through the head location of the unbalanced subtree. Referring to FIG. 2B, there is shown the tree 40' which is the tree 40 after the addition of an Entry H as a rightward child of Entry G. Addition of Entry H causes the tree 40' to be unbalanced since the rightward path from Entry F is more than one unit longer than the leftward path from Entry F which is empty. Balance may be restored to the tree by leftward rotation of Entries F and G through the location occupied by entry F. The resulting arrangement, tree 40" shown in FIG. 2C, is thereby balanced. Such a rotation is accomplished within computer memory by altering the contents of appropriate pointer fields. In the present example, the rotation is effected by changing the right pointer field of Entry E from F to G, changing the left pointer field of Entry G from a thread to a link, and changing the right link/thread field for Entry F from a link to a thread.

Figure 5A:
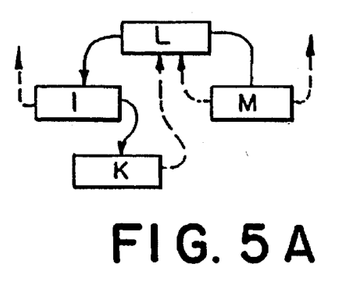
FIGS. 5A–5D are diagrams of a binary tree requiring double-rotation balancing upon insertion of an entry.
Figure 5B:
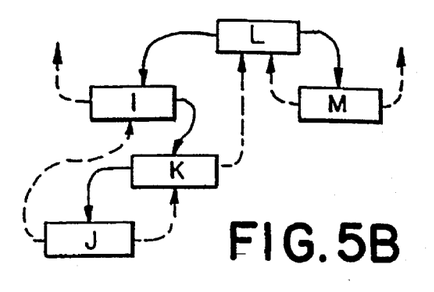
Figure 5C:
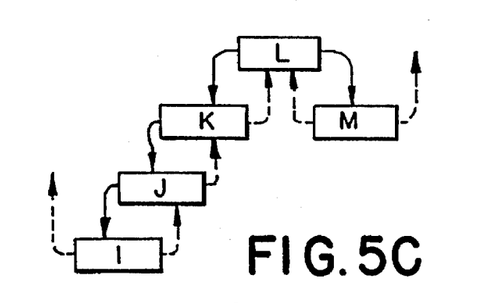
Figure 5D:
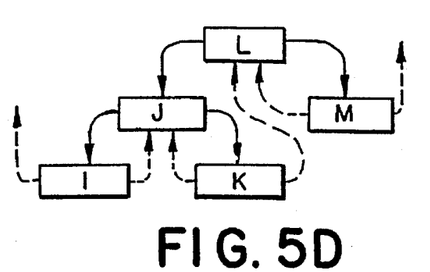

It should be appreciated that such single leftward rotations may be necessitated by addition of rightward child entries and that single rightward rotations may be necessitated by the addition of leftward child entries. Such a single rotation is required when the new child entry is added in the direction of bias at the rebalancing point, i.e. the nearest entry above the new child having a non-zero balance condition. When an entry is added to a tree in a direction opposite to the direction of bias at the rebalancing point and such addition is in the same direction as a balance bias existing in an entry located above the rebalancing point, a double rotation may be needed to restore balance. Such a situation is shown in FIG. 5A–5D. Referring to the tree shown in FIG. 5A, the Entry L has a leftward-biased condition. The Entry I has a rightward-biased condition. Addition of Entry J to the tree, as shown in FIG. 5B, causes an imbalance of the tree and necessitates rebalancing of the tree. In order to effect rebalancing, Entry I is first rotated leftward and attached to Entry J while Entry K is rotated into the position formerly occupied by Entry I as shown in FIG. 5C. Then the subtree headed by Entry K is rotated once rightward resulting in the balanced tree shown in FIG. 5D.

Several procedures pertaining to traversal, storage, retrieval and manipulation of threaded, height-balanced trees shall now be described with reference to the following functional definitions:

KEY(n)—returns the key field contents of the tree entry at location n.

BAL(n)—returns the balance bits of the tree entry at location n.

DATA(n)—returns the data field contents pertaining to entry n.

LINK(n,DIR)—returns the left or right pointer field contents of entry n depending upon the directional vector DIR. The right pointer field is referenced for vector DIR=1. The left pointer field is referenced for vector DIR=−1.

THREAD(n)—returns a pointer to entry n formatted as a thread. When a numeric value is inserted into a left or right pointer field, the default format is a link.

HEAD—returns the base address of the tree header.

SIGN(ARG)—returns the algebraic sign, having a value of 1, 0, or −1, of the argument, ARG.

The First Entry Procedure

The First Entry procedure finds the entry with the smallest key. The procedure returns the data from the entry and a provides a success flag if the tree is not empty. If the tree is empty, the First Entry procedure returns an error flag.

In step 1, the tree is locked and the right pointer field 46 of the tree header is examined in order to determine the presence of at least the root entry of the tree. If there is no right link present in the tree header, the error signal is returned. If there is a right link to the root entry present in the tree header, the root entry is placed into the variable CURR.

In step 2, the left link field of the current entry, LINK(CURR,−1), is repeatedly followed until a thread is found which indicates that the bottom of the leftward branch of the tree has been reached. A Last Entry procedure may be implemented in the same fashion by following right links instead of left links. A generic "extreme entry" procedure may also be implemented along similar lines using the directional vector in the LINK function as an input.

```
1.   LOCK TREE
     CURR <—— HEAD
     IF LINK(CURR,1) IS A THREAD;
         RETURN ERROR
         GOTO 3.
     ELSE
         CURR <—— LINK(CURR,1)
     ENDIF
2.   IF LINK(CURR, −1) IS A THREAD;
         RETURN SUCCESS
         RETURN DATA(CURR)
         GOTO 3.
     ENDIF
     CURR <—— LINK(CURR, −1)
     GOTO 2.
3.   UNLOCK TREE
```

The Next Entry Procedure

The Next Entry procedure returns the data and key values of a tree entry with a key entry equal to or successive to the input, KEY. If there are no entries of equal or greater value, or if the tree is empty, an error is returned.

In step 1, the routine is initialized and the pointer CURR is set to the tree header address. Steps 2 and 3 form a finding loop which exits from step 3 to step 5 if an entry having a key equal to KEY is found or from step 2 to step 4 if the finding path terminates in a thread.

In step 4, the thread found in step 2 is followed and the procedure proceeds to step 7.

In step 5, the pointer CURR is assigned to indicated the rightward child of the current entry (i.e. one entry to the right of the identically-keyed entry). If the right pointer of the current entry field is a thread, control passes to step 7. Otherwise control passes to step 6.

In step 6, the directional indicator is set to follow leftward links, and a loop is executed to follow leftward links until a thread is encountered. In general, following left links from a right-linked child of a given entry results in finding the next greater-keyed entry relative to the given entry. When a thread is encountered, control passes to step 7.

In step 7, the current entry passed from step 4, step 5, or step 6, is tested to determine whether the current entry is the head entry. If such is the case, an error is returned indicating that no greater-keyed entries were found. If the passed entry is not the head entry, the key field and data field contents of the current entry are returned. Otherwise, an error indication is returned.

The Next Entry procedure may easily be changed to a Previous Entry procedure by reversing the values of the directional vector in step 4, step 5, and step 6. The Next Entry and Previous Entry procedures are used as subroutines of procedures described hereinafter and are referenced as NEXT(KEY) and PREV(KEY) respectively.

```
1.   LOCK TREE
     CURR <—— HEAD
     DIR <—— 1
2.   IF LINK(CURR,DIR) IS A THREAD;
         GOTO 4.
     ENDIF
3.   CURR <—— LINK(CURR,DIR)
     DIR <—— SIGN(KEY − KEY(CURR))
     IF DIR = 0;
         GOTO 5.
     ENDIF
     GOTO 2.
4.   IF DIR = 1;
         CURR <—— LINK(CURR,DIR)
     ENDIF
     GOTO 7.
5.   CURR <—— LINK(CURR,1)
     IF CURR IS A THREAD;
         GOTO 7.
     ENDIF
6.   IF LINK(CURR,−1) IS A THREAD;
         GOTO 7.
     ENDIF
     CURR <—— LINK(CURR,−1)
     GOTO 6.
7.   IF CURR=HEAD;
         RETURN ERROR
     ELSE
         RETURN KEY(CURR)
         RETURN DATA(CURR)
     ENDIF
     UNLOCK TREE
```

The Traversal Procedure

The Traversal procedure visits each tree entry in forward sequential order according to the key values of the tree entries. The Postorder Traversal procedure in effect locates the first sequential entry, if any, in a tree and iteratively performs Next Entry searching. A "visit" may include manipulation of the entry or associated fields such as data alteration or retrieval.

In step 1, the tree is locked and a test is made to determine whether the tree is empty. If the tree is not empty, the right link to the root entry is followed.

Step 2 is a loop in which left links are followed until a thread is reached. When a thread is reached, control passes to step 3.

In step 3, a test is made to determine whether the current entry is the tree header. If such is the case, control passes to step 8. Otherwise control passes to step 4.

In step 4, the current entry is visited and the desired visitation procedure is performed. The right link/thread field is then followed. If the right link/thread field is a thread, control passes to step 3. If the right link/thread field is a link, control passes to step 5.

In step 5, left links are followed proceeding from the rightward child of the most recently visited entry in order to find the entry having the next higher key. When a thread is encountered in the leftward direction, control passes to step 3.

In step 6, the tree is unlocked and the program exits. Step 6 is reached by passage of the CURR=HEAD test in step 3 or by detection of an empty tree in step 1. For the condition CURR=HEAD to be true in step 3, the tree header must have been reached by following the right link/thread field from a visited entry in step 4. The only entry from which the header can be reached by following a right link/thread field is the entry having the highest key value in the tree. Hence, when the header has been reached in such a fashion, postorder traversal is completed.

```
1.  LOCK TREE
    IF LINK(HEAD,1) IS A THREAD;
        GOTO 6.
    ELSE
        CURR <—— LINK(HEAD,1)
    ENDIF
2.  IF LINK(CURR,-1) IS A THREAD;
        GOTO 3.
    ELSE
        CURR <—— LINK(CURR,-1)
        GOTO 2.
    ENDIF
3.  IF CURR=HEAD;
        GOTO 6.
    ENDIF
4.  VISIT NODE
    CURR <—— LINK(CURR,1)
    IF CURR IS A THREAD;
        GOTO 3.
    ENDIF
5.  IF LINK(CURR,-1) IS A THREAD;
        GOTO 3.
    ENDIF
    CURR <—— LINK(CURR,-1)
6.  UNLOCK TREE
```

The Insertion Procedure

The insertion procedure finds the insertion point in the tree for a new entry having a memory location of NEW; a key, KEY; and a data field, NEW-DATA. If an entry having KEY already exists in the tree, an error flag is returned. The insertion procedure monitors the balance bits of entries visited during the process of finding the insertion point in order to facilitate restoration of tree balance in the event that insertion causes the tree to become unbalanced. The location of a potential rebalancing point is recorded, updated and maintained during the finding process by the use of variables RP and PRP if the key fields have numeric values. If the key fields have alphanumeric values, a path buffer is employed to store a sequence, or map, of the entries visited during the finding phase and to record the location of potential rebalancing points. By recording the location of potential rebalancing points during the finding phase of the insertion procedure before new entries are inserted, considerable computational overhead is reduced relative to a tree maintenance system employing separate insertion and rebalancing procedures. The insertion procedure anticipates whether rebalancing will be necessitated by insertion of a new entry and determines the location about which such rebalancing will occur.

For trees having numeric keys, the variable RP is used to hold the location of the entry which would head an unbalanced subtree subsequent to insertion. The variable PRP is used to hold the location of the entry which was visited prior to RP during the finding process so that the proper link/thread fields may be re-connected after rotation of an unbalanced subtree.

For trees having alphanumeric keys, a stack, or path buffer, is maintained to hold the entry locations and directional vectors (corresponding in value to balance bias indicators) representing the path followed during the finding routine. Use of the path buffer obviates the need for repetitive and time-consuming alphanumeric key comparisons during rebalancing. The variable BT is used to point to the top of the path buffer. BT is incremented by the path buffer item length, PBIL, each time that an item is placed onto the path buffer by the PUSH(n,DIR) function. The path buffer item length is typically two—one for the entry location and one for the directional vector. Items are read from the path buffer by the function NODE(n) which returns the entry location of the nth item on the path buffer, and by DIR(n) which returns the directional vector associated with NODE(n). The rebalancing point is recorded in the path buffer item which is pointed to by the variable BB. The function of path buffer pointer BB corresponds to the function provided by the variable RP used for numerically-keyed trees. A variable corresponding to PRP in the number case is not needed since the entry in the finding path prior to the rebalancing point is simply the path buffer item prior to that indicated by BB (i.e. the item indexed from BB by −PBIL).

The functional operations of the insertion procedure for both numeric and alphanumeric keys are as follows: The tree is locked, the insertion point is found, and the balance condition in an entry above the insertion point corresponding to the potential rebalancing point, if any, is stored in steps 1–4. If the input entry was not found to be already in the tree during steps 1–4, the new entry is linked into the tree in step 5. In steps 6–9, it is determined whether the inserted entry was the root entry and, if not, balance factors above the inserted entry are adjusted. In step 10, it is determined whether no rotation, single rotation, or double rotation is needed in order to rebalance the tree. Step 11 adjusts link/thread fields for the first phase of double rotation. Step 12 adjusts the link/thread fields for the second phase of double rotation which is a single rotation. Step 13 links the rotated subtree back to the entry visited immediately prior to the rebalancing point in the finding path. In step 14, the tree is unlocked and the error flag, if any, is returned.

```
1.   LOCK TREE
     If the keys are numbers, go to 2a.
     If the keys are strings, go to 2b.
2a.  DIR <—— 1
     CURR <—— PRP <—— HEAD
     RP <—— LINK(CURR,DIR)
3a.  IF LINK(CURR,DIR) IS A THREAD;
         GOTO 5.
     ENDIF
     RC <—— CURR
     CURR <—— LINK(CURR,DIR)
     DIR <—— SIGN(KEY − KEY(CURR))
```

```
              IF DIR = 0;
                  ERRFLAG <—— 1
                  GOTO 14.
              ENDIF
    4a.   IF BAL(CURR)<>0;
              PRP <—— RC
              RP <—— CURR
          ENDIF
          GOTO 3a.
    2b.   DIR <—— 1
          BB <—— RB
          BT <—— RB - PBIL
          CURR <—— HEAD
          PUSH(CURR,DIR)
    3b.   IF LINK(CURR,DIR) IS A THREAD;
              GOTO 5.
          ENDIF
          CURR <—— LINK(CURR,DIR)
          DIR <—— SIGN(KEY - KEY(CURR))
          IF DIR = 0;
              ERRFLAG <—— 1
              GOTO 14.
          ENDIF
    4b.   PUSH(CURR,DIR)
          IF BAL(CURR)<>0;
              BB <—— BT
          ENDIF
          GOTO 3b.
    5.    NODES <—— NODES +1
          LINK(NEW,DIR) <—— LINK(CURR,DIR)
          LINK(CURR,DIR) <—— NEW
          LINK(NEW,-DIR) <—— THREAD(CURR)
          BAL(NEW) <—— 0
          KEY(NEW) <—— KEY
          DATA(NEW) <—— NEW-DATA
          ERRFLAG <—— 0
    6.    IF CURR = HEAD;
              HEIGHT <—— HEIGHT + 1
              GOTO 14.
          ENDIF
          If keys are numbers, goto 7a.
          If keys are strings, goto 7b.
    7a.   DIR <—— SIGN(KEY - KEY(RP))
          RC <—— CURR <—— LINK(RP,DIR)
          SD <—— DIR
    8a.   IF CURR = NEW;
              GOTO 10a.
          ENDIF
    9a.   DIR <—— SIGN(KEY - KEY(CURR))
          BAL(CURR) <—— DIR
          CURR <—— LINK(CURR,DIR)
          GOTO 8a.
    10a.  IF BAL(RP) = 0;
              BAL(RP) <—— SD
              HEIGHT <—— HEIGHT + 1
              GOTO 14.
          ENDIF
          IF BAL(RP) = -SD;
              BAL(RP) <—— 0
              GOTO 14.
          ENDIF
          IF BAL(RP) = SD;
              SB <—— 0
              CURR <—— RC
              IF BAL(RC) = SD;
                  GOTO 12.
              ELSE
                  GOTO 11.
              ENDIF
          ENDIF
    7b.   RC <—— BB + PBIL
    8b.   IF RC > BT;
              GOTO 10b.
          ENDIF
    9b.   BAL(NODE(RC)) <—— DIR(RC)
          RC <—— RC + PBIL
          GOTO 8b.
    10b.  CURR <—— NODE(BB)
          SD <—— DIR(BB)
          IF BAL(CURR) = 0;
              BAL(CURR) <—— SD
              HEIGHT <—— HEIGHT + 1
              GOTO 14.
          ENDIF
          IF BAL(CURR) = -SD;
              BAL(CURR) <—— 0
              GOTO 14.
          ENDIF
          IF BAL(CURR) = SD;
              SB <—— 0
              CURR <—— NODE(BB + PBIL)
              RP <—— NODE(BB)
              IF BAL(CURR) = SD;
                  GOTO 12.
              ELSE
                  GOTO 11.
              ENDIF
          ENDIF
    11.   RC <—— LINK(CURR,-SD)
          IF LINK(RC,SD) IS A THREAD;
              LINK(CURR,-SD) <—— THREAD(RC)
          ELSE
              LINK(CURR,-SD) <—— LINK(RC,SD)
          ENDIF
          LINK(RC,SD) <—— CURR
          IF BAL(RC) = SD;
              SB <—— -SD
          ENDIF
          IF BAL(RC) = -SD;
              BAL(CURR) <—— SD
          ELSE
              BAL(CURR) <—— 0
          ENDIF
          CURR <—— RC
    12.   IF LINK(CURR,-SD) IS A THREAD;
              LINK(RP,SD) <—— THREAD(CURR)
          ELSE
              LINK(RP,SD) <—— LINK(CURR,-SD)
          ENDIF
          LINK(CURR,-SD) <—— RP
          BAL(CURR) <—— 0
          If keys are numbers, go to 13a.
          If keys are strings, go to 13b.
    13a.  IF RP = LINK(PRP,-1);
              LINK(PRP,-1) <—— CURR
          ELSE
              LINK(PRP,1) <—— CURR
          ENDIF
          BAL(RP) <—— SB
          GOTO 14.
    13b.  IF NODE(BB) = LINK(NODE(BB-PBIL),-1);
              LINK(NODE(BB - PBIL),-1) <—— CURR
          ENDIF
          IF NODE(BB) = LINK(NODE(BB - PBIL),1);
              LINK(NODE(BB - PBIL),1) <—— CURR
          ENDIF
          BAL(NODE(BB)) <—— SB
    14.   RETURN ERRFLAG
          If keys are strings, deallocate path buffer
          UNLOCK TREE
```

The Deletion Procedure

The entry deletion procedure is more case-intensive than the insertion procedure due to the many permutations of link/thread fields that may be affected by deletion of a particular entry and the fact that several rebalancing operations may be required. During insertion, entries are added to the bottom of the tree and then rotated into position during rebalancing if necessary. Deletion of an entry, however, may be operative at any location with a tree thus requiring a more complicated readjustment procedure. Since there may be more than one rebalancing point subsequent to a deletion, a path buffer is used for deleting and rebalancing entries from both numerically and alphanumerically keyed trees.

In steps 1–3, the tree is locked and the target entry is located by a finding procedure. If the finding procedure reaches a thread, an error flag is set indicating that the target entry was not found in the tree.

In step 4, the links and/or threads to the target entry are altered to exclude the target entry from the tree. Links and threads associating neighboring entries are re-adjusted to maintain the integrity of the remaining tree. The detailed deletion procedure is divided into the four cases indicated in the deletion procedure by asterisks. It is noted that these four cases are tested in the sequence shown and thus the defining conditions of the cases are logically cumulative. The cases may be re-ordered as desired depending upon the relative likelihood of their occurrence within a given application as long as the defining conditional tests are modified appropriately.

Figure 6A:
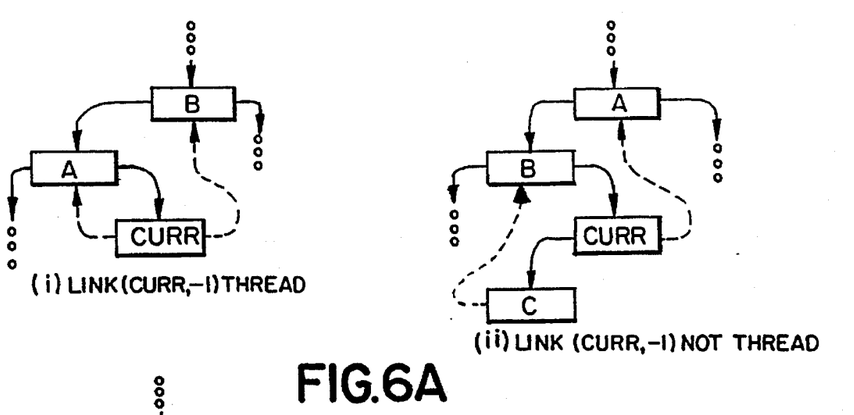
FIGS. 6A–6B are diagrams of portions of a binary tree before and after deletion of a target entry having a right thread pointer.
Figure 6B:
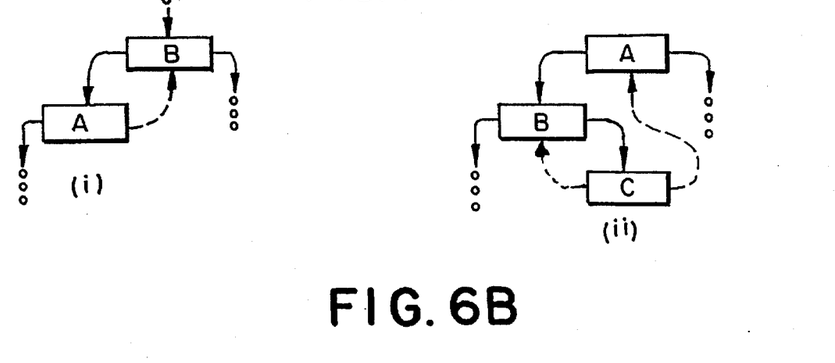

The first case, characterized by the target entry having a right thread, is further divided into two separate situations in which the left link/thread field of the target entry is (i) a thread or (ii) a link. Deletion of such a target entry and adjustment of the neighboring pointers in both situations (i) and (ii) are illustrated in FIGS. 6A–6B. In FIG. 6A, the target entry is respectively shown in situations (i) and (ii) as the entry marked CURR within a portion of a tree having neighboring entries A, B, and C. In FIG. 6B, the relationship of the neighboring entries is respectively shown in situations (i) and (ii) subsequent to deletion of the target entry and adjustment of the pointer fields of the neighboring entries. The specific pointers requiring adjustment in these situations are set forth in the procedure beginning at the step marked *1.

Figure 7A:
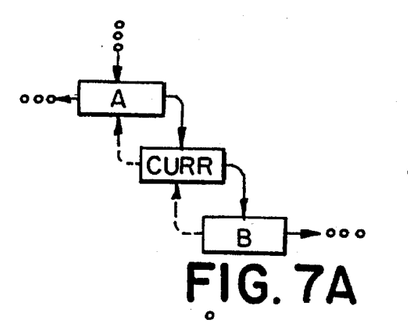
FIGS. 7A–7B are diagrams of a portion of a binary tree before and after deletion of a target entry having a left thread pointer.
Figure 7B:
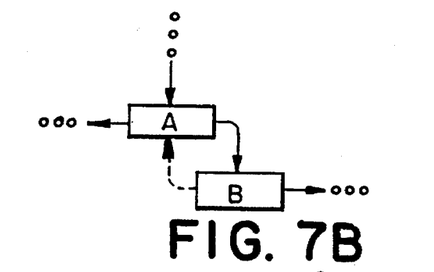

The second case is characterized by the target entry having a left thread. The right pointer field in this case contains a link to a subsequent entry since the possibility of a right thread was eliminated in the first case. Deletion and pointer adjustment in the second case are illustrated in FIGS. 7A–7B. In FIG. 7A, there is shown the target entry, CURR, having neighboring entries A and B. In FIG. 7B, there is shown the relationship of the neighboring entries subsequent to deletion of the target entry and adjustment of the neighboring entries' pointer fields. The specific pointers requiring adjustment are set forth in the procedure beginning at the step marked *2.

Figure 8A:
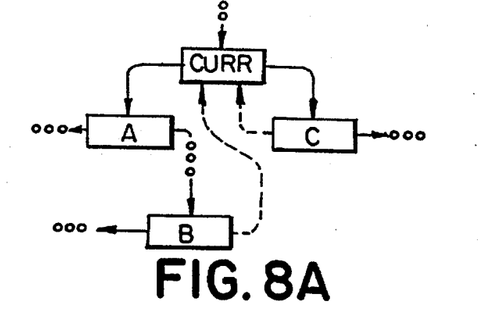
FIGS. 8A–8B are diagrams of a portion of a binary tree before and after deletion of a target entry linked to a right child entry having a left thread pointer.
Figure 8B:
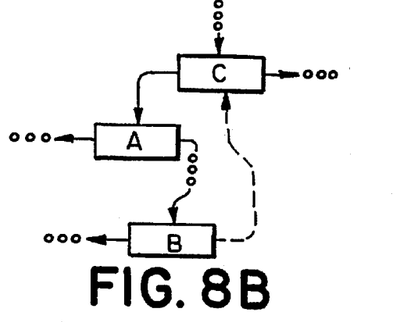

The third case is characterized by LINK(LINK(CURR, 1),–1) which is the situation where the left pointer field of the entry indicated by the right pointer field of the target entry is a thread. In this case, both of the pointer fields of the target entry contain links since all cases involving threads from the target entry have been previously eliminated. Deletion and reconstruction of link/thread fields in the third case is shown in FIGS. 8A–8B. In FIG. 8A, there is shown the target entry, CURR, having neighboring entries A, B, and C. In FIG. 8B, there is shown the relationship of the neighboring entries subsequent to deletion of the target entry and adjustment of the neighboring link/thread fields. The specific link/thread pointers requiring adjustment are set forth in the procedure beginning at the step marked, *3.

Figure 9A:
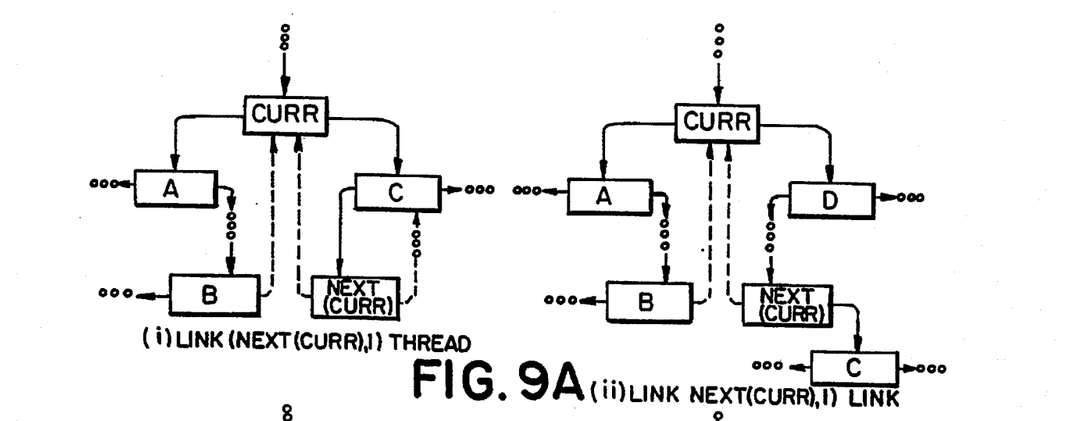
FIGS. 9A–9B are diagrams of portions of binary trees before and after deletion of a target entry being replaced by a NEXT entry.
Figure 9B:
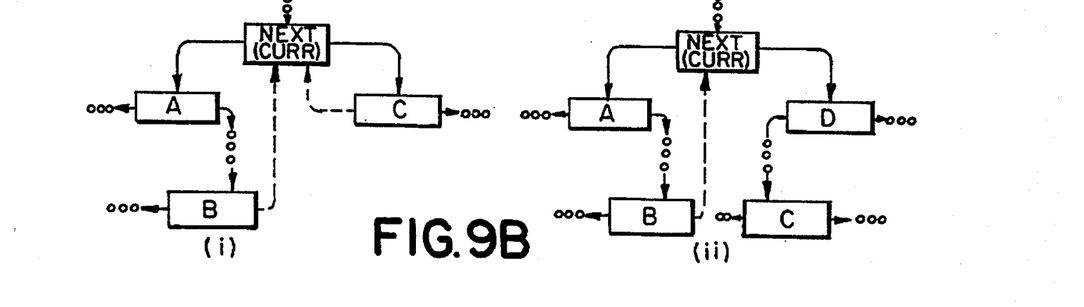

In the fourth case, the target entry is replaced by its NEXT entry, or the entry of the tree having the next higher key value. Two situations arise in this case depending upon whether the NEXT entry has (i) a right thread or (ii) a right link. Deletion of the target entry and neighboring pointer adjustment in these situations are shown in FIGS. 9A–9B. In FIG. 9A, there is respectively shown the target entry CURR having neighboring entries as defined by situations (i) and (ii). In FIG. 9B, there is respectively shown the same portion of the trees defined by situations (i) and (ii) subsequent to deletion of the target entry and adjustment of the neighboring pointer fields. The specific pointers requiring adjustment are set forth in the procedure beginning at the step marked, *4.

In step 5, a loop is started to locate rebalancing points, if any, and to make any necessary adjustments to the balance bits of the entries in the search path to the deletion point. The search path is followed in reverse by pulling items off of the path buffer that was formed during the finding phase. In step 5, the top item in the path buffer is removed from stack. If the resulting entry is the HEAD entry (indicating that the rebalancing loop has reached the beginning of the path buffer), then the deletion procedure proceeds to step 8. Otherwise, the procedure proceeds to step 6.

In step 6, the balance bias of the current entry removed from the stack in step 5 is tested to compared to the search path direction taken from the current entry to determine whether rebalancing is required and to adjust the balance bits of the current entry. If the balance bias of the current entry is zero, the bias is reset to the opposite of the search path direction from the current entry and the deletion procedure proceeds to exit at step 8. No further reverse traversal of the search path is needed since a properly maintained tree would have been balanced above a zero-biased entry prior to deletion of the target. Hence, the deletion in this case causes the zero-biased entry to become biased toward the opposite side of the search direction taken from the entry.

If in step 6, the balance bias of the current entry is in the same direction as the path vector (BAL(CURR)=DIR ), then the balance bits of the current entry are set to indicate a zero-bias since the deletion caused the subtree below the current entry to become more balanced. The deletion routine then returns to step 5 to obtain the previous path buffer entry.

Rebalancing is required whenever it is found in step 6 that the deletion occurred on the side of the current entries subtree that is opposite to the current balance bias (this third conditional test is shown in the routine for purposes of better understanding the routine, but such an explicit statement is superfluous since it is the only remaining condition possible). The appropriate rotation of the subtree is then performed. A loop control variable, CNT, is set during rotation to indicate whether the required rotation eliminated the need to continue following the search path in reverse for further rebalancing or balance bias correction. The procedure then proceeds to step 7.

In step 7, the head of the rotated subtree is linked into the rest of the tree at the location preceding the current rebalancing point. The loop control variable, CNT, is tested to determine whether more rotations may be required. If such is the case, the procedure returns to step 5. Otherwise control passes to step 8.

In step 8, the memory space previously occupied by the now-deleted entry is released to the memory manager, the NODES or Number of Entries field 41 of the tree header is decremented, the error flag is returned to the invoking process, and the tree is unlocked.

```
1       LOCK TREE
        BT <—— RB - PBIL
        DIR <—— 1
        CURR <—— HEAD
2       IF LINK(CURR,DIR) IS A THREAD;
                ERRFLAG <—— 1
                GOTO 9.
        ENDIF
3.      PUSH(CURR,DIR)
        CURR <—— LINK(CURR,DIR)
        DIR <—— SIGN(KEY - KEY(CURR))
        IF DIR = 0;
                ERRFLAG <—— 0
                GOTO 4.
        ENDIF
        GOTO 2.
4.  *1  IF LINK(CURR, 1) IS A THREAD;
                IF LINK(CURR,-1) IS A THREAD;
                        LINK(NODE(BT),DIR(BT)) <—— LINK(CURR,DIR(BT))
                        GOTO 5.
                ELSE
                        LINK(LINK(CURR,-1),1) <—— LINK(CURR,1)
                        LINK(NODE(BT),DIR(BT)) <—— LINK(CURR,-1)
                        GOTO 5.
                ENDIF
        ENDIF
    *2  IF LINK(CURR,-1) IS A THREAD;
                LINK(LINK(CURR,1),-1) <—— LINK(CURR,-1)
                LINK(NODE(BT),DIR(BT)) <—— LINK(CURR,1)
                GOTO 5.
        ENDIF
    *3  IF LINK(LINK(CURR,1),-1) IS A THREAD;
                LINK(LINK(CURR,1),-1) <—— LINK(CURR,-1)
                LINK(NODE(BT),DIR(BT)) <—— LINK(CURR,1)
                BAL(LINK(CURR,1)) <—— BAL(CURR)
                PUSH(LINK(CURR,1),1)
                LINK(PREV(CURR),1) <—— THREAD(LINK(CURR,1))
                GOTO 5.
        ENDIF
    *4  PUSH(CURR, 1)
        SBT <—— BT
        CURR <—— LINK(CURR,1)
4a.     IF LINK(CURR,-1) IS A THREAD;
                GOTO 4b.
        ENDIF
        PUSH(CURR,-1)
        CURR <—— LINK(CURR,-1)
        GOTO 4a.
4b.     IF LINK(CURR,1) IS A THREAD;
                LINK(NODE(BT),-1) <—— THREAD(CURR)
        ELSE
                LINK(NODE(BT),-1) <—— LINK(CURR,1)
        ENDIF
        SBT1 <—— BT
        BT <—— SBT
        LINK(CURR,-1) <—— LINK(NODE(BT),-1)
        LINK(CURR,1) <—— LINK(NODE(BT),1)
        BAL(CURR) <—— BAL(NODE(BT))
        LINK(PREV(NODE(BT)),1) <—— THREAD(CURR)
        BT <—— BT - PBIL
        LINK(NODE(BT),DIR(BT)) <—— CURR
        PUSH(CURR,1)
        BT <—— SBT1
5.      CURR <—— NODE(BT)
        DIR <—— DIR(BT)
        BT <—— BT - PBIL
        IF CURR = HEAD;
                HEIGHT <—— HEIGHT - 1
                GOTO 8.
        ENDIF
6.      IF BAL(CURR) = 0;
                BAL(CURR) <—— -DIR
                GOTO 8.
        ENDIF
        IF BAL(CURR) = DIR;
                BAL(CURR) <—— 0
                GOTO 5.
        ENDIF
        IF BAL(CURR) = -DIR;
                RC <—— LINK(CURR,-DIR)
```

```
        IF BAL(RC) = BAL(CURR);
            BAL(CURR) <—— 0
            BAL(RC) <—— 0
            CNT <—— 1
            GOTO 7.
        ENDIF
        IF BAL(RC) = -BAL(CURR);
            IF BAL(CURR) = BAL(LINK(RC,DIR));
                BAL(CURR) <—— -BAL(LINK(RC,DIR))
                BAL(RC) <—— 0
            ELSE
                BAL(CURR) <—— 0
                BAL(RC) <—— -BAL(LINK(RC,DIR))
            ENDIF
                BAL(LINK(RC,DIR)) <—— 0
                RC1 <—— LINK(RC,DIR)
                IF LINK(RC1,-DIR) IS A THREAD;
                    LINK(RC,DIR) <—— THREAD(RC1)
                ELSE
                    LINK(RC,DIR) <—— LINK(RC1,-DIR)
                ENDIF
                LINK(RC1,-DIR) <—— RC
                RC <—— RC1
                CNT <—— 1
                GOTO 7.
        ENDIF
        IF BAL(RC) = 0
            BAL(RC) <—— -BAL(CURR)
            CNT <—— 0
        ENDIF
    ENDIF
7.  IF LINK(RC,DIR) IS A THREAD;
        LINK(CURR,-DIR) <—— THREAD(RC)
    ELSE
        LINK(CURR,-DIR) <—— LINK(RC,DIR)
    ENDIF
    LINK(RC,DIR) <—— CURR
    LINK(NODE(BT),DIR(BT)) <—— RC
    IF CNT = 1
        GOTO 5.
    ENDIF
8.  Deallocate Memory
    NODES <—— NODES - 1
    RETURN ERRFLAG
    UNLOCK TREE
```

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

What is claimed is:

1. A computer implemented method for adding an entry to a balanced binary tree organizational system for storing numeric and alphanumeric data within a memory of a computing machine, comprising computer implemented steps of:

(a) determining whether said entry includes one of an alphanumeric key or a numeric key;

(b) retrieving pointers from the memory of the computing machine to find an insertion location along a search path in a balanced binary tree at which to add the entry and recording a potential rebalancing point in a manner that is dependent upon whether said entry is determined to include an alphanumeric key or a numeric key; and (c) replacing at least one of said pointers within the memory of the computing machine with a new pointer to the entry.

2. The method of claim 1 further comprising steps of:

(a) determining whether the tree has become unbalanced as a result of said replacing step; and (b) balancing the tree about said potential rebalancing point.

3. The method of claim 1 wherein said determining step includes determining that said key is a numeric key, and wherein said retrieving and recording step comprises the steps of:

(a) storing a first value for indicating a location of a biased entry of the tree nearest said insertion location in said path;

(b) storing a second value indicative of the location of an entry having a link pointer to said biased entry; and (c) updating said first and second values when a subsequent biased entry is encountered along the search path.

4. The method of claim 1 wherein said retrieving and recording step comprises the step of constructing a map of the search path followed during said retrieving and recording step when the entry includes an alphanumeric key.

5. The method of claim 4 wherein said constructing step includes pushing items representative of said path onto a stack.

6. The method of claim 5 wherein said pushing step comprises storing within the stack: (i) a pointer to each memory location along the search path from which a pointer was retrieved during said retrieving and recording step and (ii) a value representing a direction of the search path within the tree relative to said each memory location.

7. The method of claim 6 wherein said retrieving and recording step comprises the step of maintaining a pointer to an item stored in said stack for indicating a most recently visited balance-biased entry in said stack whereby said potential rebalancing point is recorded.

8. The method of claim 1 wherein said determining step comprises determining that said entry includes an encoded alphanumeric key and wherein said retrieving and recording step comprises obtaining a stack pointer to a stack from a header associated with the tree and using the stack indicated by said stack pointer for constructing a map of the search path.

9. The method of claim 1 wherein said retrieving and recording step comprises:

storing within the memory of the computing machine, a map of the search path when the entry includes an encoded alphanumeric key; and storing a potential rebalancing value for indicating a location of a biased entry in said path nearest said insertion location when the entry includes a numeric key.

10. The method of claim 1 comprising the step of storing a pointer type identifier in association with said new pointer for identifying whether said new pointer is one of a link pointer or a thread pointer.

11. A computer memory for storing key-indexed data in a data processing system, said key-indexed data having a key selected from a group consisting of alphanumeric keys and numeric keys, and the data processing system being connected with the memory and having means for determining whether said key is alphanumeric or numeric, the memory comprising:

a hierarchical data structure for providing access to the key-indexed data by the data processing system including:

(a) a plurality of entries, each entry having:

(i) a key field for storing an ordinal value unique to said each entry within the data structure;

(ii) at least two pointer fields for pointing to at least two respective neighboring entries, each of said two pointer fields including type means for indicating the type of ordinal relation between contents of the key field of said each entry and contents of the key field of said respective neighboring entry, said pointer fields forming a plurality of search paths within said hierarchy; and (iii) balance means for indicating the relative predominance of ordinal successors and ordinal predecessors subordinate to said each entry in said hierarchical data structure; and (b) header means for storing information related to managing said access to said hierarchical data structure by the data processing system comprising:

(i) a pointer field for allowing the data processing system to locate said plurality of entries;

(ii) lock means for providing an indication that said access is in progress whereby said access may be rendered exclusive; and (iii) buffer means for selectively providing a buffer for the data processing system to record a selected one of said search paths during access to said data structure in response to a determination whether said key field contains an alphanumeric key or a numeric key.

12. The computer memory of claim 11 wherein said type means comprises a bit for indicating whether said respective neighboring entry is superior or inferior to said each entry within said hierarchical data structure.

13. The computer memory of claim 11 wherein said balance means comprises a bit within each of said pointer fields.

14. The computer memory of claim 11 wherein said buffer means comprises a stack pointer.

15. A data storage system, comprising: a computer having a memory;

a balanced binary tree data structure stored within the memory, said data structure comprising a plurality of node entries occupying locations within said memory, the node entries having link pointers and thread pointers; and the computer having insertion means for inserting a new node entry into the data structure, said insertion means comprising:

determining means for determining whether said new entry includes one of a numeric key or an alphanumeric key;

finding means for finding a location along a search path within said data structure at which to insert said new entry;

recording means cooperative with said finding means for recording a potential rebalancing location in said data structure at which to perform rebalancing of the tree, the recording means comprising storage means responsive to said determining means for selectively storing (i) a pointer to said potential rebalancing location when said key is determined to be a numeric key, and (ii) a map of said search path and a pointer indicating said potential rebalancing location in the map when said key is determined to be an alphanumeric key; and balancing means responsive to said recording means for retrieving said potential rebalancing location and for balancing the tree after insertion of the new entry.

* * * * *